2,782,197
PREPARATION OF KETO PYRIMIDINES

Mortimer T. Harvey, South Orange, N. J., assignor to Harvel Research Corporation, a corporation of New Jersey No Drawing. Application February 2, 1951,
Serial No. 209,202

6 Claims. (Cl. 260—251)

This invention relates to novel compounds which are isomers of each other and to methods for producing them as well as to novel compositions in which one or more of them is a component thereof. In one of its more specific aspects the invention is directed to novel individual isomeric compounds as well as to mixtures thereof produced from urea together with mesityl oxide and/or diacetone alcohol.

The compounds of this invention are pseudo-hormones or act in the nature of certain hormones. They may be used either alone or in combination as additives in animal feeds, such as ground cattle feed and laying mash for poultry. I have discovered that when fed to chickens, for example, and especially to culls, the laying quality of such chickens may be materially increased. As a matter of fact, in some cases chickens which should have been laying but had never laid before, have been fed these compounds in very small amounts and within two to three weeks thereafter have commenced laying.

In general, these novel compounds may be produced by reacting molecular equivalents of urea and diacetone alcohol or mesityl oxide. This reaction takes place in the presence of an acidic agent or catalyst which may be a mineral acid, examples of which are hydrochloric and sulphuric acids. In one of its specific aspects the urea may react with diacetone alcohol or mesityl oxide while slowly adding, with constant stirring to said mixture, an acidic agent such as dry hydrochloric acid. The reaction during the hydrochloric addition is exothermic and the temperature of the reacting mass is preferably maintained over the most part between 25° C.–50° C. and preferably between about 35° C.–40° C. by external cooling and by controlling the rate of supplying the hydrochloric acid to the mass. The quantity of dry hydrochloric acid supplied during the reaction may vary, for example in a mass of 60 grams urea and 135 grams of diacetone alcohol or mesityl oxide between 10–100 grams of dry hydrochloric acid may be used. After the last increment of the desired amount of hydrochloric acid has been added slowly and the reacting mass has been maintained substantially continuously at 25° C.–50° C. and preferably 35° C.–40° C. to reduce or substantially completely obviate resinous formation which takes place at high temperatures and to obtain high yields of the compound, the mass after substantial completion of the exothermic reaction may be poured into an equal volume of cold water and allowed to stand for cooling whereupon crystallization occurs. Instead of pouring the reaction mass at that stage into the cold water it may be allowed to stand for from 3 to 72 hours for somewhat enhancing the yield. In any case the reaction mass in combination with the water may be immediately neutralized by the addition of aqueous sodium hydroxide and then allowed to cool, preferably over night whereupon crystals precipitate out. The crystals may be separated from the liquid phase in any desired manner such as by filtration and then the raw crystals containing some impurities may be admixed with alcohol or a solution of equal volumes of alcohol and water. The mixture is brought to boiling so that solution of the crystals takes place and then the hot mixture is rapidly filtered. The filtrate is cooled whereupon crystallization occurs. The crystals therein are subjected to 4 or 5 or more further recrystallizations in the manner herein before set forth whereupon there is obtained a substantially chemically pure product composed of carbon, hydrogen, nitrogen and oxygen and containing susbtantially 60% by weight of carbon and substantially 20% by weight of nitrogen and having the following empirical formula: $C_7N_2H_{12}O$ and being a white crystalline material being slightly soluble in hot water, soluble in hot alcohol, soluble in hot alcohol-water and soluble in hot alcohol-toluene 1–1. The crystals made with diacetone alcohol are mono diacetone alcohol mono urea and have a melting point of approximately 279–280° C., while those made with mesityl oxide are mono mesityl oxide mono urea and have a melting point of approximately 290–291° C. These compounds have the following structure or are isomers thereof:

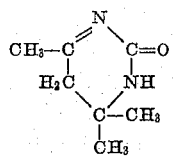

These purified products as well as those before neutralization and/or purification besides being useful for the purposes hereinbefore set forth may be hydrogenated to saturate only one or more of the double bonds. The carbonyl group (C=O) may be converted by hydrogenation to (COH) which if desired may have the hydroxyl thereof converted to $NH_2$, with the double bond of the N being present or having been changed by hydrogenation. They also may be oxidized to produce substituted amino acids. They also may be treated to convert either one or both of the trivalent nitrogens therein to the pentavalent state.

The following are examples given merely for the purpose of illustrating the novel compounds and methods for producing the compounds of this invention without in any way limiting the invention, all parts being given by weight unless otherwise specified.

Example 1

Although the molecular ratio of reactants may be varied, I prefer to employ them in approximately molecular proportions. 240 grams of urea and 540 grams of diacetone alcohol were placed in a glass reacting vessel. Then over a period of approximately 30 minutes, while the mass was being constantly stirred, there was slowly and uniformly bubbled therein about 56 grams of dry hydrochloric acid while the temperature of the mass, with the aid of external cooling as required, was maintained at approximately 40° C. throughout substantially the entire addition. During that period solution and reaction took place. After the termination of the hydrochloric acid addition, the mass was still maintained in the state of agitation by stirring and at a temperature no greater than 40° C. for approximately an additional 15 minutes. Then with the cooling medium completely removed the mass was allowed to stand for a period of 3 to 72 hours. At the end of that period of standing the mass was poured into an approximately equal volume of water and then there was added thereto a quantity of a solution of aqueous sodium hydroxide to render it substantially neutral and at this stage considerable crystallization occurred. The neutralized mass was allowed to stand for cooling for a period of about 16 hours and then the crystals were separated from the liquid phase by filtration or any other convenient method. The raw crystals were then dissolved in a hot 1–1 alcohol-water solution and the temperature of the mass was elevated to about boiling and at this temperature was filtered. The filtrate was allowed to cool whereupon crystallization takes place. The crystals were separated from the liquid phase and were again treated in the manner before set forth for recrystallization. This recrystallization procedure was carried out 3-6 more times to provide 350 grams of substantially chemically pure crystalline product known as Product A having a melting point of approximately 279–280° C., and shows decomposition at or about said melting point.

*Example 2*

Employing the same procedure as that set forth in Example 1 and employing 540 grams of mesityl oxide in place of the diacetone alcohol, there is obtained a novel compound having the empirical formula set forth and either having the structural formula set forth or being an isomer thereof. When mesityl oxide is employed the reaction proceeds considerably faster than with the diacetone alcohol and considerably greater care must be exercised in maintaining the temperature of the mass during reaction at the preferred 35–40° C. level. In this case it is not as necessary, although advisable for maximum yields, to allow the mass to stand after the exothermic reaction has subsided for high yields and therefore at the termination of that reaction the mass may be poured directly into the cold water and the neutralization, crystallization and recrystallization as set forth in Example 1 are carried out and there is obtained more than 250 grams of substantially chemical pure, crystalline product known as Product B having a melting point of approximately 290–291° C.

*Example 3*

An alternate method for producing the compounds Product A and Product B of Examples 1 and 2 is to place 1¾ moles of concentrated sulfuric acid in a glass lined reacting vessel. Then, while being constantly stirred, there is added thereto slowly and while being externally cooled, 1 mole proportion of powdered urea. The vessel is being constantly cooled during the addition to maintain the temperature of the mass at a value of no higher than 40° C. and between about 35–40° C. After all of the urea has been added to the sulfuric acid, to this mass there is slowly added 1½ mole proportion of diacetone alcohol or mesityl oxide while the mass is being constantly stirred and maintained at a temperature between 35–40° C. Then the mass is allowed to stand for at least 24 hours and is subsequently diluted with two volumes of water and neutralized with an aqueous solution of sodium hydroxide. The neutralized mass is allowed to stand for cooling and crystallization for a period of about 16 hours. The crystalline precipitate may be purified in the manner as that described in Examples 1 and 2.

The carbon, hydrogen and nitrogen determinations on Product A and Product B individually gave the following results which compare closely to their theoretical in the compound whose structure and empirical formula have hereintofore been set forth:

|  | Theoretical | Product A, Average Found | Product B, Average Found |
| --- | --- | --- | --- |
| Percent C | 60.0 | 59.99 | 59.90 |
| Percent H | 8.6 | 8.69 | 8.55 |
| Percent N | 20.0 | 20.05 | 19.43 |
| Percent O (by difference) | 11.4 | 11.29 | 12.12 |

While the methods for producing the novel reaction products have been described in detail, it is understood that various changes and modifications may be made, as for example other acidic catalysts, or other alkaline neutralizing agents may be employed without departing from the spirit of this invention to produce the novel reaction products being compounds of probable indicated formulae and probable indicated isomeric characteristics.

Having thus described the invention, what I claim is:

1. A novel organic reaction product selected from the group consisting of (a) urea-diacetone alcohol organic reaction product which in substantially purified condition is normally a white crystalline solid having a melting point of approximately 279° C.–280° C. and (b) urea-mesityl oxide organic reaction product which in substantially purified condition is normally a white crystalline solid having a melting point of approximately 290° C.–291° C., each of said products (a) and (b) composed of carbon, hydrogen, nitrogen and oxygen, having a carbon content of substantially 60% and a nitrogen content of substantially 20%, and being substantially insoluble in cold water and substantially soluble in hot 1–1 hot alcohol-water.

2. A novel organic reaction product being urea-diacetone alcohol organic reaction prodct which in its substantially purified condition is normally a white crystalline solid composed of carbon, hydrogen, nitrogen and oxygen, having a carbon content of substantially 60% and a nitrogen content of substantially 20%, having a melting point of 279° C.–280° C. and being substantially insoluble in cold water and substantially soluble in hot 1–1 hot alcohol-water.

3. The method comprising reacting urea and a compound selected from the group consisting of diacetone alcohol and mesityl oxide to produce an organic reaction product which in purified condition is normally a white crystalline solid composed of carbon, hydrogen, nitrogen and oxygen, having a carbon content of substantially 60% and a nitrogen content of substantially 20% and being substantially insoluble in cold water and soluble in hot 1–1 water-alcohol.

4. The method defined in claim 3, with said reacting carried out in the presence of an acidic catalyst.

5. The method defined in claim 3, with said reacting being carried out in the presence of substantially dry hydrochloric acid.

6. A novel organic reaction product being urea-mesityl oxide organic reaction product which in its substantially purified condition is normally a white crystalline solid composed of carbon, hydrogen, nitrogen and oxygen and having a carbon content of substantially 60% and a nitrogen content of substantially 20%, having a melting point of 290° C.–291° C. and being substantially insoluble in cold water and substantially soluble in hot 1–1 hot alcohol-water.

References Cited in the file of this patent

UNITED STATES PATENTS 2,234,848  Ter Horst  Mar. 11, 1941

OTHER REFERENCES

Beilstein: Vierte Auflage, vol. 24, pages 71–72.